United States Patent [19]

Hijikata

[11] 4,024,353
[45] May 17, 1977

[54] KEY TELEPHONE SYSTEM
[75] Inventor: Tokuhisa Hijikata, Ome, Japan
[73] Assignee: Iwatsu Electric Co., Ltd., Tokyo, Japan
[22] Filed: Oct. 17, 1975
[21] Appl. No.: 623,488
[30] Foreign Application Priority Data
 Jan. 21, 1975 Japan .............................. 50-9589
[52] U.S. Cl. .............................. 179/99; 179/18 FA
[51] Int. Cl.² .......................................... H04M 1/00
[58] Field of Search ................. 179/99, 81 R, 18 F, 179/18 FA, 81 C

[56] References Cited
UNITED STATES PATENTS

| 3,239,610 | 3/1966 | Morse et al. | 179/99 |
| 3,453,396 | 7/1969 | Lacey et al. | 179/99 |
| 3,739,104 | 5/1973 | O'Neill | 179/99 |
| 3,865,995 | 2/1975 | Kerman et al. | 179/99 |
| 3,887,774 | 6/1975 | Takubo et al. | 179/99 |
| 3,895,192 | 7/1975 | Angner et al. | 179/99 |
| 3,916,116 | 10/1975 | McEowen | 179/18 FA |

*Primary Examiner*—Kathleen H. Claffy
*Assistant Examiner*—Gerald L. Brigance
*Attorney, Agent, or Firm*—Oblon, Fisher, Spivak, McClelland & Maier

[57] ABSTRACT

A line circuit for a key telephone system is provided with a first relay normally energized and a second relay for speech supervision. The operation of the first relay establishes a circuit for holding the second relay and the first relay is released by the voltage drop of a control line normally connected to a line holding control circuit and a visual indication circuit, respectively, at the manual operation of a non-lock type hold key to establish an intermittent signal for line holding indication. A switching transistor is provided in a circuit including the first relay so that the first relay is not energized by the signal intermittently sent to the visual indication circuit, so as to control the line hold control circuit and the visual indication circuit by one control line.

7 Claims, 4 Drawing Figures

KEY TELEPHONE SYSTEM

BACKGROUND OF THE INVENTION

1. Field of the Invention

This invention relates to a key telephone system and more particularly to a circuit for controlling a line circuit in a key telephone system.

2. Description of the Prior Art

A key telephone system generally comprises a plurality of key telephone sets, a service unit provided with a line circuit and a common line circuit. A key telephone system employs service features for incoming calls such as line holding, transfer and intercom using locking-type keys in the form of a group of manually operable switches having a common latch arrangement for maintaining one of the switches in the actuated condition until another switch is actuated. The status of the service features is indicated by a visual indicator comprising lamps or light emitting diodes (LEDs), buzzers and the like. Generally, incoming call indication is performed by an intermittent audible tone of a buzzer in synchronism with lighting or extinguishment of the visual indicator representing the presence of an incoming call. Line holding indication is performed by lighting or extinguishment of the visual indicator at a cycle time different from that of an incoming call indicator. Talking indication, representing the in-use status of a telephone line (i.e., "busy" status) is performed by continuous illumination of the visual indicator. Conventionally in order to satisfy these service features, four lines are required, as shown in U.S. Pat. No. Re 26,722. For example line No. 1 in that patent is connected between each line circuit of the service unit and the key telephone sets. Two speech lines T and R, one visual control line LL and one holding control line AL are also provided between each line circuit of the service unit and the key telephone sets.

However, modern key telephone systems are becoming large in size, causing increases in the number of corelines required in cables connected between the service unit and key telephone sets and in the number of corelines in telephone set and terminal connector cables which increases the cost of installation and parts for connection. Furthermore, the increase in the number of corelines and connection parts raises the risk of equipment failure and maintenance difficulties in key telephone systems.

SUMMARY OF THE INVENTION

Accordingly, one object of the invention is the provision of an improved key telephone system.

Yet another object of the invention is the provision of an improved key telephone system of lower cost, simplified structure and requiring fewer interconnecting cables.

Still another further object of the invention is the provision of a novel full service key telephone system with circuitry for reducing the number of required interconnecting cables.

Another object of the present invention is to provide a key telephone system with visual or audible indication and line holding performed by two speech and one control line.

Briefly, these and other objects of the invention are achieved by providing a first relay, normally energized, and a second relay for speech supervision in a line circuit of a key telephone system, wherein the operation of the first relay establishes a circuit for holding a state of the second relay. The first relay is released by the voltage drop of a control line connected normally to a line holding control circuit and a visual indication circuit respectively at the manual operation of a non-lock type hold key to thereby establish a circuit generating signal intermittently for a line holding indication. A switching transistor is provided with a circuit comprising the first relay so that the first relay is not actuated by the signal intermittently sent to the visual indication circuit, thereby controlling the line holding control circuit and the visual indication circuit with one control line.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
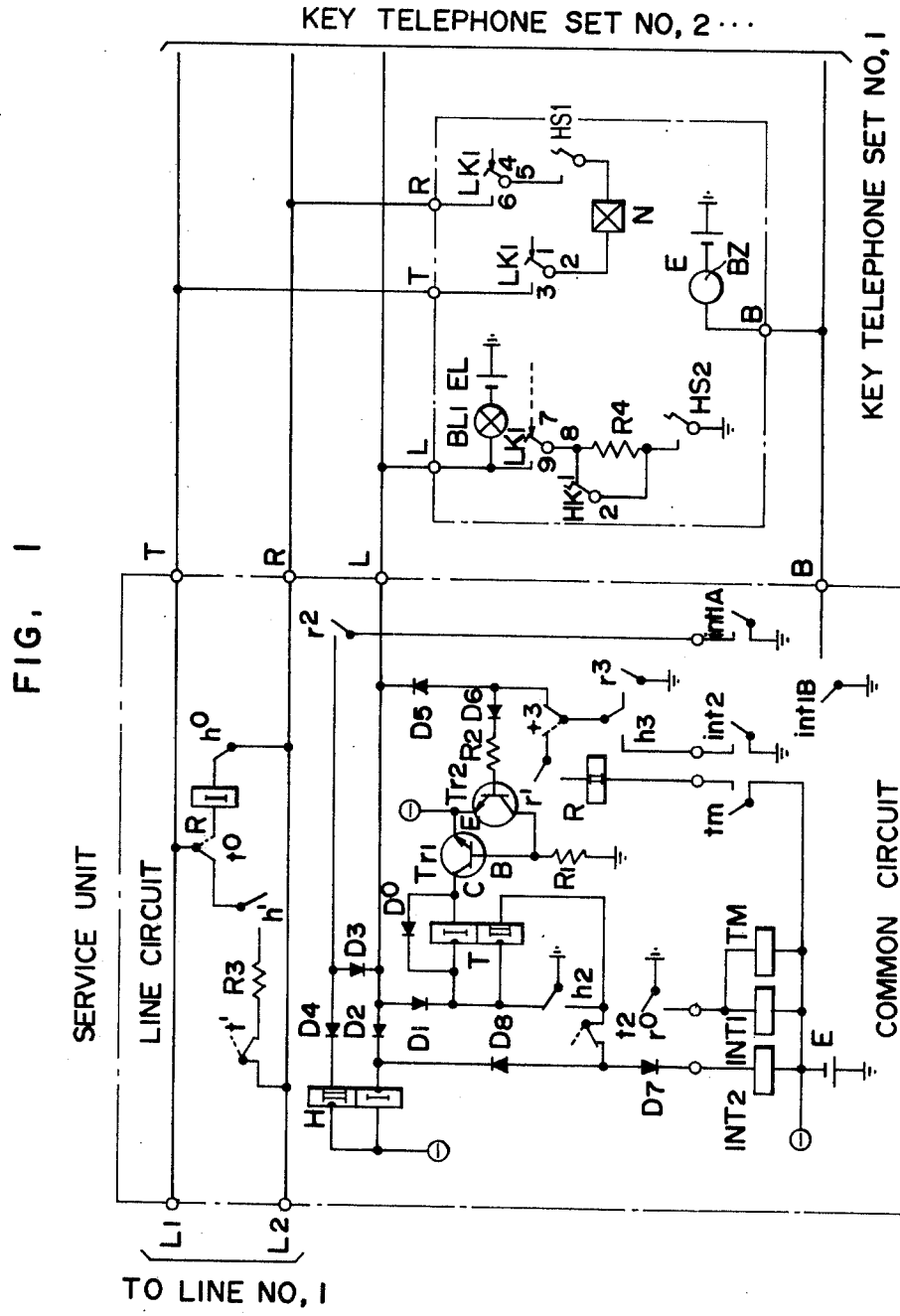
FIG. 1 is a schematic diagram of the key telephone system of the present invention.

Referring now to the drawings, wherein like reference numerals designate identical or corresponding parts throughout the several views, and more particularly to FIG. 1 thereof, $L_1$, $L_2$ represent line connection terminals, while T, R, L and B indicate cable and connection terminals between key telephone sets and a service unit. T and R are the speech lines. The L line is a control line which controls both speech supervision such as line holding and visual indication of the use status of lines. Line B is a control line which controls audible indication, by buzzer or the like, when an incoming call signal is received. In a line circuit No. 1 of the service unit, R represents a relay for detecting incoming call signals, R(I) is a primary winding receiving signals from the line, R(II) is a secondary winding forming a self holding circuit, $r^0 \ldots r^3$ are contacts of the relay R. H is a relay for speech supervision and line holding which includes two windings (I), (II). The contacts of the relay H are denoted by $h^0 \ldots h^3$. T is a relay for supervision of both stoppage of electric current and speech which includes two windings. The contacts of the relay T are denoted by $t^0 \ldots t^3$. Transistor $Tr_1$ normally assumes the on-state due to base-current flowing through a resistor $R_1$ to thereby supply to the relay T. Transistor $Tr_2$ assumes the on-state during line holding in order to control a visual indicator, while transistor $Tr_1$ assumes the off-state, thereby to cut off power source E supplying relay T. Resistor $R_2$ is a resistor limiting the base-current of transistor $Tr_2$. Resistor $R_3$ is a resistor employed in order to form a direct current loop during line holding to the C.O. or P.B.X. $D_0$ is a diode which makes the relay T restore after a delay to the relay H when line talking is terminated. $D_1 - - - D_8$ are diodes which prevent reverse current. $INT_1$ is a common circuit of the service unit and is an oscillating or intermittent circuit with a frequency of 2.5Hz for flashing or cycling both the visual indicator and the audible indicator when an incoming call signal is received. The circuit $INT_1$ comprises coils and capacitors.

Contacts of the oscillating circuit $INT_1$ are denoted by $int_{1A}$ and $int_{1B}$. TM is a timer circuit for closing the self-holding circuit of secondary winding R(II) of relay R for a predetermined time when an incoming call signal is received. The contact of the timer TM is denoted by $tm$. $INT_2$ is an intermittent circuit with 1Hz frequency for lighting or extinguishing a visual indicator during line holding. The contact of the intermittent circuit $INT_2$ is denoted by $int_2$. In telephone set No. 1, N indicates a telephone circuit network, $HS_1$, $HS_2$ are switch-hooks, $LK_1$ is a line key corresponding to line No. 1 for selecting the line corresponding to each line circuit, wherein HK is a non-lock type key for line holding. The hold key HK is operated in association with the operation of the line key $Lk_1$.

$BL_1$ is an indicator lamp, EL is an electric source for the lamp $BL_1$, BZ is a buzzer for indicating incoming calls and E is an electric source. $R_4$ is a resistor connected to the line L when switch-hook $HS_2$ is closed, wherein the resistor $R_4$ is employed in order to change the voltage or potential in the line L. A zener diode may be used in place of the resistor $R_4$.

Operation of the present invention will now be described with reference to FIG. 1, it being understood that the relays shown in the drawings are released as shown in the drawings.

Normal Condition

When electric power source is switched on, base-current of transistor $Tr_1$ in the line circuit flows through resistor $R_1$ so that the transistor $Tr_1$ assumes the on-state. Relay T is energized by current flowing in the primary winding T(I), so that contacts $t^0$ – – – $t^3$ are operated. The relay T is energized through a circuit comprising ground, contact $h^2$, primary winding T(I), transistor $Tr_1$ (C–E) and electric source E.

Incoming Call

When an incoming call signal is received at lines $L_1$, $L_2$ of line No. 1, contact $r^0$ of primary winding R(I) of relay R is energized and closes so that the oscillating circuit $INT_1$ and the timer circuit TM operate in a common circuit. Accordingly, intermittent contacts $int_{1A}$ and $int_{1B}$ and contact $tm$ operate. At the same time, a self holding circuit for the second winding R(II) is formed by the following circuit path to hold the operating states of the relay R and of the receiving circuit. The circuit path includes ground, contact $r^3$, contact $h^3$, contact $t^3$, contact $r^1$, secondary winding R(II), contact $tm$ and electric power source E. As a result thereof, an indicating lamp $BL_1$ of a key telephone set lights or is extinguished in response to intermittent operation of the intermittent contact $int_{1A}$ by the following circuit path; ground, intermittent contact $int_{1A}$, contact $r^2$, diode $D_3$, line L, lamp $BL_1$ and electric power source E. At the same time the buzzer BZ sounds intermittently controlled by the following circuit; ground, intermittent contact $int_{1B}$, line B, buzzer BZ and electric power source E. At this time current flows in primary winding H(I) and secondary winding H(II), but relay H is not actuated because the primary winding H(I) and the secondary winding H(II) are connected in the following circuit so as to cancel the magnetic forces generated by each other; ground, intermittent contact $int_{1A}$, contact $r^2$, diode $D_4$ in parallel with diode $D_3$ and diode $D_2$, primary and secondary windings H(I) and H(II) of relay H and electric source E.

Communication

When the hand-set of one of the key telephones is removed from its cradle after a locking type line key $LK_1$ is actuated, the telephone circuit network is connected to the line circuit through speech lines T and R so as to put the hand-set into communication condition. At the same time, the indication lamp $BL_1$ continues to light because line L is grounded through the hook-switch $HS_2$ and a contact of the line key $LK_{1(8-9)}$. At this time, it is indicated that line No. 1 is busy. At the same time, when line L is grounded, relay H of the line circuit is energized along the following circuit path in response to opening of the intermittent contact $int_{1A}$; ground, hook switch $HS_2$, hold key $HK_{1-2}$, line key $LK_{1(8-9)}$, line L, diode $D_2$, primary winding H(I) of the relay H and electric power source E. At this stage, even if the line L is grounded, current does not flow in the secondary winding H(II) of the relay H because of diode $D_2$. When the relay H operates, the primary winding R(I) of the relay R in the receiver circuit is disconnected because of the operation of contact $h^0$ and contact $h^3$ of relay H. At the time contacts $r^0$ – – – $r^3$ of relay R restore because the secondary winding R(II) of the self-holding circuit is disconnected from ground. As a result, the intermittent circuit $INT_1$ and the timer circuit TM deenergize so that the buzzer BZ stops sounding due to restoration of the intermittent contact $int_{1B}$. The primary winding (I) of the relay T remains actuated while the line is in use even if contact $h^2$ is operated as ground line L is connected to the primary winding T(I) of the relay T through diode $D_1$.

Line holding

In performing line holding during communication, when the non-locking type hold key HK is depressed, the potential of line L drops because a resistor $R_4$ is connected in series with the line key $LK_1$ and the switch-hook $HS_2$. However, at this stage, if the relay H is set to hold by way of primary winding H(I) and the voltage potential of the line L is set at the line holding value so as to be lower than that of the common connecting point of the primary winding T(I) and the secondary winding T(II) of the relay T in relation to the total resistance values of the primary winding H(I) of the relay H, the primary winding T(I), the secondary winding T(II) of the relay T and the resistor $R_4$, the current does not flow through diode $D_1$ in the forward direction. As a result current flows in the relay T by way of the following circuit path; ground, contact $h^2$, secondary winding T(II), primary winding T(I), transistor $Tr_{1(C-E)}$ and electric power source E. Accordingly if the number of windings of the primary winding T(I) of the relay T is the same as that of the secondary winding T(II), magnetromotive forces of the primary and secondary windings are cancelled so that the relay T restores, as the same current flows from the starting point of the primary winding T(I) and from the end point of the secondary winding T(II). As a result the relay T restores. At this time the relay H continues to hold itself by way of the following circuit path; ground, contact $h^2$, contact $t^2$, diode $D_8$, primary winding H(I) of the relay H, electric power source, and the line is held by inserting the resistor $R_3$ through the contact $t^0$, contact $h^1$ and contact $t^1$ between line $L_1$ and line $L_2$.

On the other hand, the intermittent circuit $INT_2$ in the common circuit operates by way of the following circuit path; ground, contact $h^2$, contact $t^2$, diode $D_7$, intermittent circuit $INT_2$ and electric power source E. When the hold key HK is released, the line key $LK_1$ having a mechanism in association with the hold key HK is restored from the locking condition so that telephone circuit is opened and the line L is disconnected from ground through the line key $LK_{1(8-9)}$.

Accordingly, indicator lamp $BL_1$ lights and extinguishes in synchronism with the intermittent period of the intermittent contact int so as to indicate the line holding status by way of the following circuit path, ground, intermittent circuit $int_2$, contact $h^3$, contact $T^3$, diode D de $D_5$, line L, lamp $BL_1$ and electric power source EL. In this stage, when the relay T is energized by the ground connected to the line L because of the intermittent operation of the intermittent contact $int_2$, the line holding condition is released. In order to prevent the line holding condition from releasing, transistor $Tr_2$ assumes the on-state through both a diode $D_6$ and a resistor $R_2$ by way of ground potential when the ground is connected to the line L by the operation of the intermittent contact $int_2$ so that transistor $Tr_1$, usually assuming the on-state and allowing the primary winding T(I) of the relay T to supply electric power switches to the off-state, as the base-emitter path of the transistor $Tr_1$ is short-circuited. As a result the relay T is prevented from operating.

Answering a Line On Hold

In the case of answering again a line being held as mentioned above, when a hand-set is taken up from its cradle after the line key $LK_1$ is depressed, a telephone circuit is connected to the line circuit through the speech lines T and R so that a talking circuit is established. On the other hand, when the intermittent contact $int_2$ in the common circuit is opened, the transistor $Tr_2$ assumes the off-state so that the transistor $Tr_1$ assumes the on-state. Accordingly, the relay T is energized by way of the following circuit path; ground, switch-hook $HS_2$, line key $LK_{1(8-9)}$, line L, diode $D_1$, primary wind T(I), transistor $Tr_{1(C-E)}$ and electric power source E. Accordingly, in response to the relay T being energized by the intermittent circuit $INT_2$, the line being held is restored by the opening of the contact $t_2$ and a loop circuit comprising the resistor $R_3$ is disconnected from the lines T and R. The indicator lamp $BL_1$ continues to light because the line L is connected to the ground. In this situation, operation of the relay H is held by the primary winding H(I) being connected to the ground.

Termination of Talking

When hand-set is put on the cradle upon termination of talking, the switch-hook $HS_1$ is opened so that the talking circuit is disconnected from the line. At the same time, the L is disconnected from the ground. As a result current is cut off in the primary winding H(I) of the relay H and in primary winding T(I) of the relay T. At this stage, the relay H restores first. The primary winding T(I) is connected in parallel with a diode $D^0$. . . Accordingly, when the relay T restores, an instantaneous current flows through diode $D^0$ due to the reverse electromotive force induced in the primary winding T(I) so that the relay T restores with a delay. As a result, the relay H restores earlier than the relay T. When the relay H restores, the operation of the relay T continues in a normal state again by way of the following circuit path; ground, contact $h^2$, relay T, transistor $Tr_{1(C-E)}$ and electric power source E.

Figure 2:
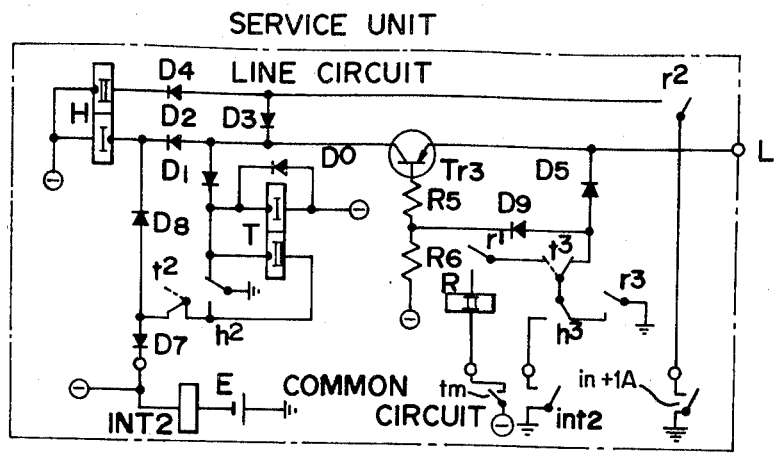
FIG. 2 and FIG. 3 illustrate other embodiments of the line circuit in the key telephone system of the present invention; and, FIG. 4 illustrates another embodiment of key telephone set in the key telephone system of the present invention.

Another embodiment of the present invention will now be described referring to FIG. 2 and FIG. 3. FIG. 2 illustrates a circuit similar to that of FIG. 1 with the exception that a transistor $Tr_3$ is provided for controlling the operation of the relay T. A diode $D_9$ is provided for preventing reverse current from flowing. $R_5$ and $R_6$ are resistors for limiting the base-current of transistor $Tr_3$. The operation of the relay T will now be explained for the situation when the line is held.

In the talking condition of line No. 1, the line L is connected to ground through switch-hook $HS_2$ of the key-telephone set so that the transistor $Tr_3$ assumes the on-state. As a result thereof, the relay H and the relay T are energized respectively by way of the following circuit path: as to the relay H; ground, line L, transistor $Tr_3$, diode $D_2$, primary winding H(I) of the relay H and electric power source E and as to the relay T; ground, line L, transistor $Tr_3$, diode $D_1$, primary winding T(I) of the relay T and electric power source E. At this stage, when the line is held, the operation of the relay H continues as explained in the embodiment of FIG. 1, but the relay T restores due to the voltage drop of the line L. At the same time, the contacts $---t^0$ $t^3$ of the relay T restore so that the intermittent circuit $INT_2$ for line holding is actuated and the indication lamp $BL_1$ for line holding lights or extinguishes so as to indicate the status of line holding, for the line L is connected to ground by way of the intermittent operation of the intermittent contact $int_2$. The transistor $Tr_3$ switches to the off-state because the base of the transistor $Tr_3$ is connected through diode $D_9$ and resistor $R_5$ to the ground intermittently so that no potential exists between the base and emitter of the transistor. As a result, the operation of the relay T is prevented due to the line L being connected to ground.

Figure 3:
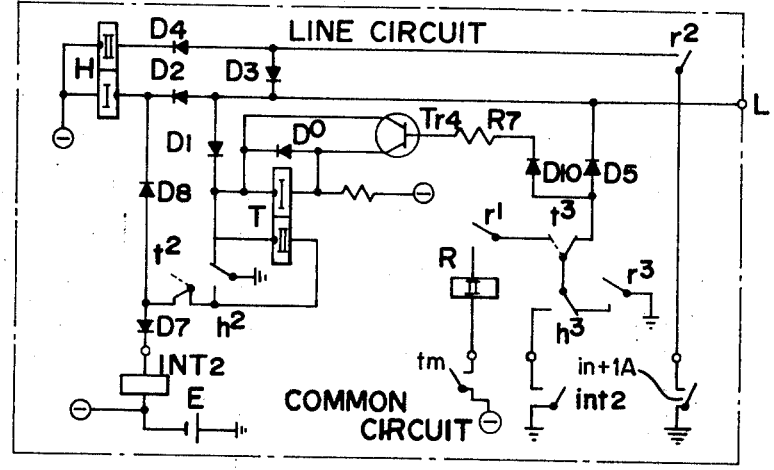

Another embodiment of the present invention will be explained with reference to FIG. 3, wherein all parts except the circuit as shown in FIG. 3 are the same as the circuit of FIG. 1. In FIG. 3 $Tr_4$ is a transistor which controls the operation of the relay T, $D_{10}$ is a diode for preventing current from flowing in the reverse direction and $R_7$ is a resistor for limiting the base current of the transistor $Tr_4$. When line holding is performed from the communication condition, the transistor $Tr_4$ assumes the on-state because the base of the transistor $Tr_4$ is connected to the ground through intermittent contact $int_2$, diode $D_{10}$ and resistor $R_7$. As a result, both ends of the primary winding T(I) of the relay T are shorted so that operation of the relay T due to the line being connected intermittently to ground is prevented.

Figure 4:
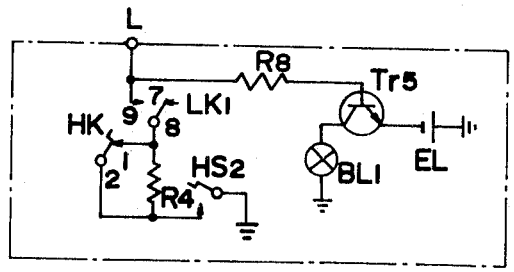

FIG. 4 shows another embodiment of a lamp circuit for a key telephone system connected to the line L as shown in FIG. 1. As shown in FIG. 4, a transistor $Tr_5$ is provided for controlling indicator lamp $BL_1$ and making the impedance of the lamp circuit connected to the line L higher, for there is the possibility of affecting on the operation of relay H and relay T when indication lamp $BL_1$ lights due to the low impedance of the lamp circuit shown in FIG. 1. In FIG. 4 $R_8$ is a resistor for limiting the base-current of the transistor $Tr_5$.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. A key telephone system comprising:
   a visual indicator circuit for indicating both holding and in-use conditions of telephone line,
   a line holding control circuit,
   a control line connected to said visual indicator circuit and to said line holding control circuit,
   a line circuit comprising a first normally energized relay for a talking supervision, said first relay restoring in response to a voltage drop on said control line and a second relay for line holding control;
   means responsive to said telephone line being manually placed on hold, for establishing a self-holding circuit for said second relay and for sending an intermittent ground on said signal line to said visual indicator circuit regarding the line being held,
   means responsive to said telephone line being manually placed on hold, for dropping the voltage potential of said control line so as to restore said first relay; and,
   switching transistor means for preventing said first relay from operating in response to said intermittent ground when a line is being held.

2. A key telephone system as in claim 1, wherein said means for preventing said first relay from operating comprises:
   a first switching transistor means for assuming an on-state in response to connection of said control line to ground potential upon a line being held; and,
   a second transistor means for assuming an off-state in response to switching on of said first transistor, whereby said first relay is disconnected from ground potential over said control line so as not to operate upon a line being held.

3. A key telephone system as in claim 1, wherein said means for preventing said first relay from operating comprises:
   a switching transistor means for assuming an on-state in response to connection to ground potential over said control line upon a line being held, whereby said first relay is disconnected from ground potential over said control line so as not to operate upon a line being held.

4. A key telephone system as in claim 1, wherein said means for preventing said first relay from operating comprises:
   a switching transistor means for assuming an on-state in response to connection to ground potential over said control line upon a line being held, whereby said first relay is shortcircuited so as not to operate upon a line being held.

5. A key telephone system as in claim 1, wherein:
   said means for dropping said voltage potential of said control line comprises a resistor.

6. A key telephone system as in claim 1, wherein:
   said line holding control circuit is connected in series with said visual indicator circuit.

7. A key telephone system comprising:
   a visual indicator circuit for indicating both holding and in-use conditions of telephone line,
   a line holding control circuit,
   a control line connected to said visual indicator circuit and to said line holding control circuit,
   a line circuit comprising a first normally energized relay for a talking supervision, said first relay restoring in response to a voltage drop on said control line, and a second relay for line holding control,
   means responsive to said telephone line being manually placed on hold, for establishing a self-holding circuit for said second relay and for sending an intermittent ground on said signal line to said visual indicator circuit regarding the line being held,
   means responsive to said telephone line being manually placed on hold, for dropping the voltage potential of said control line so as to restore said first relay, and
   switching transistor means for preventing said first relay from operating in response to said intermittent ground when a line is being held,
   said visual indicator circuit comprising:
   a current limiting resistor, one end of which is connected to said control line,
   a transistor, the base-electrode of which is connected to the other end of said current limiting resistor,
   an electric power source connected to the emitter electrode of the transistor, and
   a light emitting element connected to said collector electrode of said transistor.

* * * * *